United States Patent [19]

Fukuda

[11] Patent Number: 4,988,245
[45] Date of Patent: Jan. 29, 1991

[54] CHAMFERRING MACHINE

[75] Inventor: Kenji Fukuda, Tokyo, Japan

[73] Assignee: Nitto Kohki Co., Ltd., Tokyo, Japan

[21] Appl. No.: 243,276

[22] Filed: Sep. 12, 1988

[30] Foreign Application Priority Data

Oct. 20, 1987 [JP] Japan .................. 62-160070

[51] Int. Cl.$^5$ ........................... B23C 1/20
[52] U.S. Cl. .................. 409/178; 144/134 D;
                               144/136 C; 409/182
[58] Field of Search .......... 409/138, 178, 180, 175;
                               144/134 D, 134 E, 136 C; 30/477

[56] References Cited

U.S. PATENT DOCUMENTS

| | | | |
|---|---|---|---|
| 1,514,894 | 11/1924 | Carter | 409/178 |
| 2,635,655 | 4/1953 | Linstead | 144/134 D |
| 3,207,193 | 9/1965 | Godfrey et al. | 144/134 X |
| 3,212,541 | 10/1965 | Burrows et al. | 144/134 D |
| 3,489,191 | 1/1970 | Blevins | 144/134 D |
| 3,628,579 | 12/1971 | Roche | 409/178 X |
| 3,893,372 | 7/1975 | Strakeljahn | 144/134 D X |
| 3,913,447 | 10/1975 | Roche | 144/134 E X |
| 3,955,607 | 5/1976 | Roche | 144/134 D |
| 4,655,653 | 4/1987 | Hall et al. | 409/182 |
| 4,674,548 | 6/1987 | Mills et al. | 144/134 D |
| 4,711,799 | 12/1987 | Gove | 409/178 X |

FOREIGN PATENT DOCUMENTS 100814  6/1987  Japan .................. 409/175

Primary Examiner—Z. R. Bilinsky
Attorney, Agent, or Firm—Nixon & Vanderhye P.C.

[57] ABSTRACT

A chamferring machine has a machine body provided with a rotary cutter formed with cutting edges on its outer periphery. The rotating cutting edges chamfer the side edge of a workpiece. A guide is mounted on the base of the machine body and has two guide surfaces intersecting at a predetermined angle and brought into contact with the side edge of the to-be-chamferred workpiece. The cutting edges of the rotary cutter are partially exposed through a hole formed in the guide, at the intersection of the guide surfaces. A displacement unit is provided on the machine body and the guide, for moving the rotary cutter relative to the guide, in the axial directions of the displacement unit.

6 Claims, 3 Drawing Sheets

4,988,245

CHAMFERRING MACHINE

BACKGROUND OF THE INVENTION

1. Field of the Invention

The present invention relates to an improvement in a portable chamferring machine which performs chamferring by means of a rotary cutter and, more particularly, to a chamferring machine having a mechanism for moving the rotary cutter axially relative to a workpiece.

2. Description of the Related Art

A conventional chamferring machine for chamferring the side edges of a workpiece by means of a rotary cutter having cutting edges formed on its periphery is disclosed in U.S. Pat. No. 4,655,653. This machine has a main body having at the distal end of which is provided a rotary cutter and includes a guide formed by two orthogonally intersecting guide surfaces which are brought into contact with the surfaces of the workpiece at both sides of the side edge to be chamferred. A crosswise extending hole is formed at the intersection between these guide surfaces such that the cutting edges of the inclined rotary cutter are exposed therethrough.

Because, in the case of conventional chamferring machines, there is a fixed positional relationship between the side edges of the workpieces being chamferred and the rotary cutter, this results in only one portion of the cutting edges performing cutting, which causes comparatively rapid wear thereof. Not only does such rapid wear increase the risk of damage to the cutting portion but, more importantly, necessitates the frequent replacement of the entire rotary cutter, which is both inconvenient and uneconomical.

SUMMARY OF THE INVENTION

It is an object of the present invention to provide a chamferring machine, in which a rotary cutter can be moved axially so that its cutting edges are displaced with respect to the side edges of a workpiece to be chamferred, and the axial movement of the rotary cutter can be finely adjusted.

In order to achieve this object of the present invention, there is provided a chamferring machine, which comprises a machine body provided with a driving source and housing a spindle driven thereby; a rotary cutter coaxially fixed to the free end of the spindle and having cutting edges formed on the periphery thereof; a guide having two guide surfaces surrounding the rotary cutter, extending at predetermined angles with respect to the rotary cutter and intersecting at a desired angle, and a crosswise extending hole formed at the intersection between the guide surfaces such that part of the rotary cutter is exposed thereby; and a displacement unit provided on the machine body and the guide base, for axially displacing the rotary cutter relative to the crosswise extending hole.

The displacement unit can be constituted by a screw adjusting unit provided on the machine body and the guide base.

The rotary cutter is periodically displaced axially the displacement unit, thereby to expose a new portion of the cutting edges through the hole, either at a predetermined time interval or when the cutting edge portion currently in use becomes dull. As a result, chamferring can be continued, without the need to replace the rotary cutter with a new unit. In addition, the entire length of the cutting edges of the rotary cutter can be used.

When the displacement unit is constituted by a screw adjusting unit, the guide base can be accurately moved in an axial direction of the rotary cutter, by a distance of one screw pitch of the screw adjusting unit per rotation of the guide base. When the guide base is rotated in a clockwise direction with respect to the machine body, it is moved toward the distal end of the rotary cutter. On the other hand, when the guide base is rotated counter-clockwise, it is displaced toward the proximal end of the rotary cutter. Since the pitch of the screw adjusting unit is very fine, the position of the rotary cutter relative to the crosswise extending hole of the guide base can therefore be very finely adjusted.

BRIEF DESCRIPTION OF THE DRAWINGS

The present invention can be fully understood from the following detailed description, with reference to the accompanying drawings, in which.

DESCRIPTION OF THE PREFERRED EMBODIMENT

Figure 1:
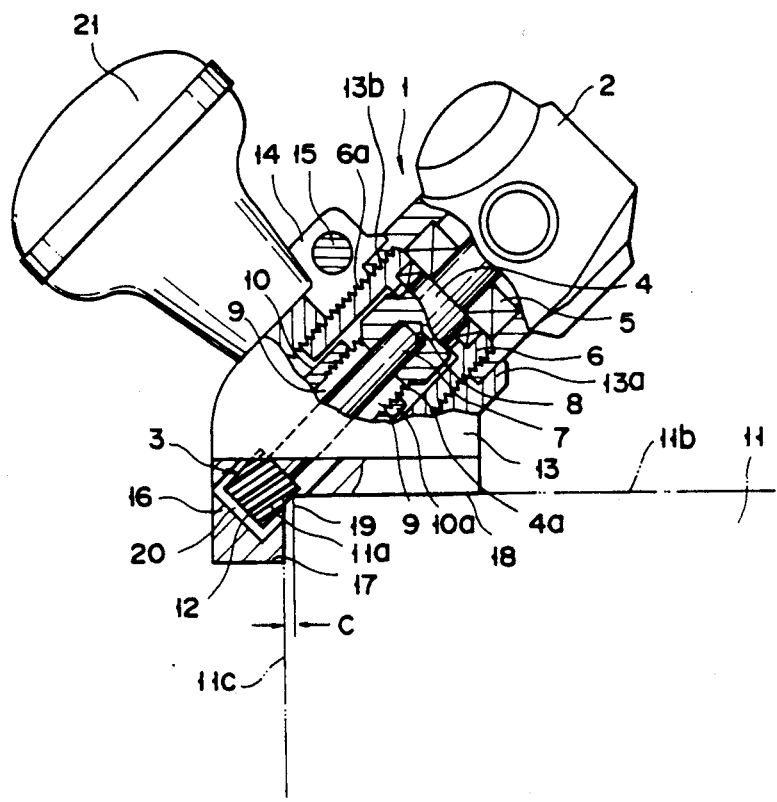
FIG. 1 is a right side view, showing in partial cross section, of a chamferring machine according to an embodiment of the present invention, wherein the rotary cutter is in the most advanced position.
Figure 2:
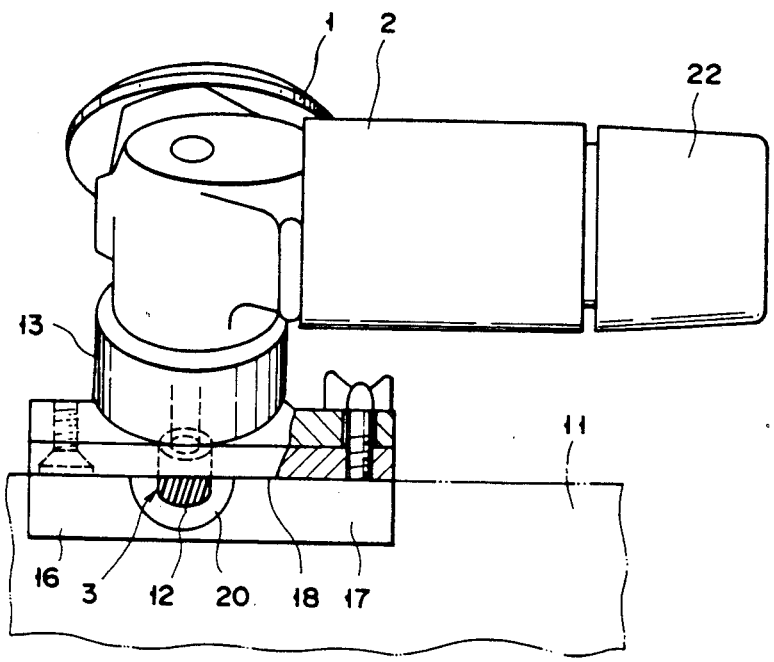
FIG. 2 is a rear view of the chamferring machine shown in FIG. 1.

Referring to FIG. 1 a machine body 1 having a substantially L-shaped structure comprises: a grip portion 2 provided with a driving source 22 (FIG. 2), such as an electric or air motor with a reduction mechanism; and a spindle housing 6 fixed to driving source 22 and including a spindle 4 for supporting rotary cutter 3 and a bearing unit 5 for spindle 4.

A central hole 8 is formed in spindle 4 and extends from its distal end to its central portion, and shank 7 of rotary cutter 3 is fitted thereinto. A plurality of longitudinal slots 9, spaced apart circumferentially, are formed in the portion of spindle 4 surrounding central hole 8, so as to give flexibility to the distal end portion of spindle 4. Male threads 4a formed on spindle 4 are engaged with female threads 10a formed in a chuck ring 10, such as a cap nut, whereby shank 7 is fixed to spindle 4.

As in the case of the conventional rotary cutter, a plurality of parallel cutting edges 12 are formed on that outer cylindrical periphery of rotary cutter 3 which has the same diameter throughout the whole length thereof.

Male threads 6a, of small pitch, are formed on the outer periphery of spindle housing 6 of machine body 1, and are engaged with female threads 13b formed in boss 13a of guide base 13. A bolt 15 extends through a pair of ears 14 formed on split portions of boss 13a, and is fastened by a nut, so as to fasten guide base 13 to machine body 1.

Guide 16, fixed to the bottom of guide base 13, has guide surfaces 17 and 18 which are arranged perpendicular to each other and brought into contact with those side surfaces of workpiece 11 which intersect at the edge to be which is chamferred. A crosswise extending hole 19 is formed at the intersection of guide surfaces 17 and 18, and serves to expose part of cutting edges 12 of rotary cutter 3. In this embodiment, since the chamferring angle is 45 degrees, both guide surfaces 7 and 18 of guide base 13 intersect with the axis of rotary cutter 3 at 45 degrees. When two adjacent side surfaces of the workpiece which define its side edge to be chamferred are not perpendicular to each other, guide surfaces 17 and 18 must make an angle equal to the angle defined by the two adjacent side surfaces of the workpiece.

A cylindrical hole 20 is formed in a portion of guide 16 which is adjacent to crosswise extending hole 19, to enable rotary cutter 3 to be admitted thereinto.

In operation, an operator holds grip portion 2 and a knob 21 fixed on the outer periphery of guide base 13, to place guide surfaces 17 and 18 of guide 16 on the corresponding surfaces 11b and 11c defining to-be-chamferred side edge 11a of workpiece 11. Driving source 22 is started to rotate rotary cutter 3, and when the chamferring machine is moved along side edge 11a of workpiece 11, cutting edges 12 of rotary cutter 3, extending a predetermined length out from crosswise extending hole 19 of guide 16, chamfer side edge 11a of workpiece 11 by an amount indicated by C in FIG. 1.

When that portion of cutting edges 12 currently in use has become dull, bolt 15 is loosened and guide base 13 is rotated, together with guide 16, with respect to machine body 1, to change the position of machine body 1 relative to guide base 13. Rotary cutter 3 is then moved in the desired axial direction, so that a new portion of cutting edges 12 appears in hole 19, the distance and direction of movement of rotary cutter 3 being determined by the rotational angle and the rotational direction of guide base 13 and the pitch of male threads 6a and female threads 13b.

Figure 3:
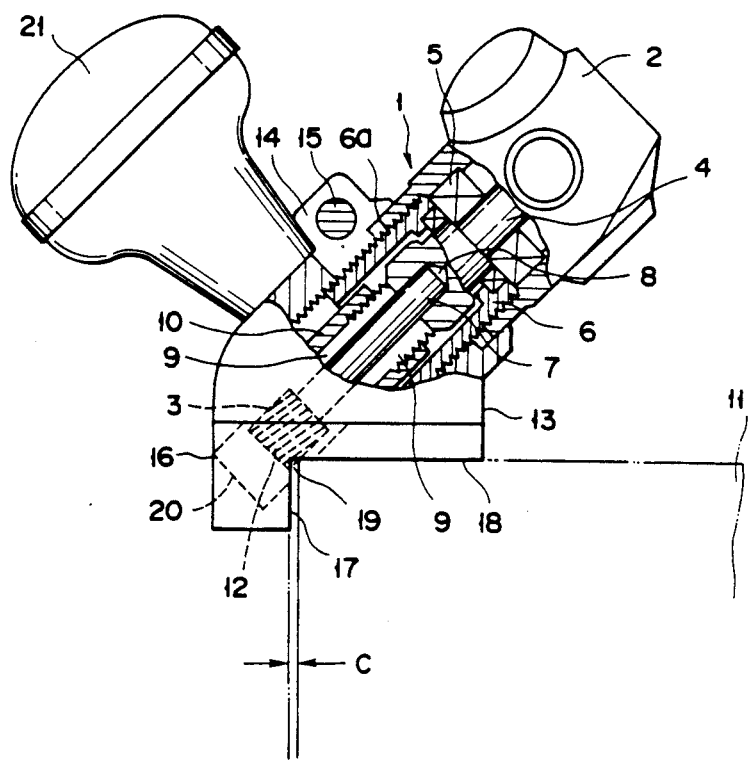
FIG. 3 is a right side view, showing in partial cross section, of the chamferring machine shown in FIG. 1, wherein a rotary cutter is in the most retracted position.

Let it be assumed that workpiece 11 begins to be cut by that portion of cutting edges 12 close to the proximal portion of shank 7, as shown in FIG. 1. Over time, as the engagement of male threads 6a and female threads 13a increase, rotary cutter 3 gradually moves closer to spindle 4, until finally the distal end portion of cutting edges 12 appears in hole 19, as shown in FIG. 3. Moreover, it will be observed that the boss 13a overlaps an outer peripheral portion of the machine body 1 throughout the range of axial adjustment of the cutting edges 12. In this way, cutting edges 12 can be used throughout their entire length, with the result that the rotary cutter has to be replaced much less frequently, and is used much more efficiently, than in the case of the conventional chamferring device. In short, therefore, the chamferring machine according to the present invention dispenses with the time-consuming, cumbersome operation of having to replace the cutter at frequent intervals, and in doing so, makes much more efficient use of each rotary cutter.

Rotary cutter 3 can be moved and adjusted as described above, any time such an operation is desired or at regular intervals, when the chamferring machine is in steady, continuous use.

The axial moving distance of rotary cutter 13 in relation to crosswise extending hole 19 is determined by the rotational angle of guide base 13 with respect to spindle housing 6 and the pitch of male threads 6a and female threads 13b. When the rotational direction and the number of rotations or the rotational angle of guide base 13 are predetermined, the moving distance of guide base 13 can be easily ascertained without the need for a special mark of scale. As a result, displacement and adjusting operations can be performed quickly and easily. In addition, since the guide base is coupled to the machine body by thread engaging means, the little time is also required for fine adjustment position of the rotary cutter relative to the guide base.

What is claimed is:

1. A chamferring machine comprising:
    a machine body including a driving source, a spindle housing fixed to said driving source and having an outer periphery, and a spindle housed in said spindle housing, driven by said driving source and having a free end and an outer periphery;
    a rotary cutter having a shank fixed to said free end of said spindle, coaxially therewith, and an outer cylindrical periphery having the same diameter throughout the whole length thereof and formed with cutting edges;
    a guide base surrounding said spindle and having one end remote from said free end of said spindle and the other end close thereto, said guide base having at said one end thereof a boss;
    a guide fixed to the other end of said guide base, surrounding said rotary cutter and having two guide surfaces forming a predetermined intersecting angle, each of said guide surfaces extending at a predetermined angle with respect to said rotary cutter, said guide having a crosswise extending hole formed therein, at the intersection of said guide surfaces, such that part of said cutting edges of said rotary cutter extends from said crosswise extending hole; and
    displacing means for axially displacing said rotary cutter relative to said crosswise extending hole such that new portion of said cutting edges of said rotary cutter extend from said crosswise extending hole at said intersection of said guide surfaces when said part of said cutting edges of said rotary cutter has become dull, said displacing means comprising male threads formed on said outer periphery of said spindle housing, female threads formed in said boss of said guide base and engaging said male threads and adjusting means for adjusting the degree of engagement between said male threads and said female threads.

2. A machine according to claim 1, wherein said machine body comprises a grip portion provided with said driving source and said spindle, and wherein said spindle housing is cylindrical so as to coaxially surround said shank of said rotary cutter, and wherein said spindle housing is fixed to said grip portion.

3. A machine according to claim 1, wherein said boss comprises a split ring, two ears formed on split portions of said ring, and a bolt for fixing said ears.

4. A machine according to claim 2, wherein said spindle has a central hole for receiving said shank of said rotary cutter, circumferentially spaced longitudinal expansion slits formed in said spindle, and a chuck ring surrounding said expansion slits and tightening said spindle.

5. A machine according to claim 4, wherein said expansion slit has an outer periphery formed by other male threads and said chuck ring has an inner periphery formed by other female threads which engage said other male threads.

6. A machine for chamferring an edge of a workpiece comprising:
    a machine body having an outer peripheral surface and including a driving source, and a spindle driven by means of said driving source, said spindle having a free end and an outer periphery;
    a rotary cutting element having proximal and distal ends, a periphery cutting surface having at least first and second generally cylindrical and adjacent cutting sections disposed between said proximal and distal ends, and a shank which coaxially joins said proximal end of said cutting element to said free end of said spindle;

a guide base having a pair of guide surfaces surrounding said rotary cutter and forming a predetermined intersecting angle, each of said guide surfaces extending at a predetermined angle with respect to said rotary cutter so as to establish a preselected chamferring angle, said guide base defining a crosswise extending hole which is located at the intersection of said guide surfaces so that a selected one of said first and second cutting sections of said peripheral cutting surface of said rotary cutter is brought into contact with said workpiece edge to thereby chamfer the same at said preselected angle, while the other of said first and second cutting sections is out of contact with said workpiece edge; and cutter adjustment means for axially displacing said rotary cutter element relative to said guide base throughout a range of adjustment thereof between said proximal and distal ends to allow the other of said first and second cutting sections to be brought into contact with said workpiece edge via said defined hole in said guide base while said one of said first and second cutting sections is displaced relative to said workpiece edge so as to be out of contact therewith, whereby a fresh cutting section of said rotary cutting element may be brought into contact with said workpiece edge after another cutting section thereof has been dulled, and wherein, said cutter adjustment means includes;
(i) a spindle housing fixed to, and extending from, said machine body for coaxially rotatably supporting said spindle;
(ii) said guide base including a boss extending towards said machine body;
(iii) thread means threadably interconnecting said spindle housing and said boss for causing said cutter element to be axially displaced relative to said guide base in response to relative rotational movements between said boss and said spindle housing; wherein
(iv) said boss overlaps a lower portion of said outer peripheral surface of said machine body so as to cover said thread means throughout said adjustment range of said cutter element.

* * * * *